United States Patent [11] 3,622,416

| [72] | Inventor | Jack P. Brandt<br>Stoughton, Wis. |
|---|---|---|
| [21] | Appl. No. | 809,132 |
| [22] | Filed | Mar. 21, 1969 |
| [45] | Patented | Nov. 23, 1971 |
| [73] | Assignee | Uniroyal, Inc.<br>New York, N.Y. |

[54] METHOD OF MAKING REINFORCED VINYL FABRIC
17 Claims, 2 Drawing Figs.

[52] U.S. Cl. .................................................. 156/178, 156/247, 156/280
[51] Int. Cl. .................................................. B32b 5/00
[50] Field of Search ...................................... 156/176, 179, 247, 178, 280

[56] References Cited
UNITED STATES PATENTS

| 3,037,895 | 6/1962 | Quinn ........................... | 156/179 X |
| 3,284,268 | 11/1966 | Rosler ........................... | 156/179 X |
| 3,511,739 | 5/1970 | Hebberling ................... | 156/179 X |

Primary Examiner—Benjamin R. Padgett
Assistant Examiner—Stephen J. Lechert, Jr.
Attorney—Robert J. Patterson ABSTRACT: A reinforced vinyl resin fabric is made using a reinforcing material, such as nylon, which ordinarily exhibits a high degree of thermal contraction at normal vinyl plastisol fusion temperatures, without creating discontinutities in the vinyl resin coating, by first casting a layer of vinyl plastisol on a support web, applying the reinforcing material and raising the temperature of the plastisol to the gelation stage and teen removing the support web prior to raising the temperature of the coated fabric to the fusion temperature.

PATENTED NOV 23 1971 3,622,416
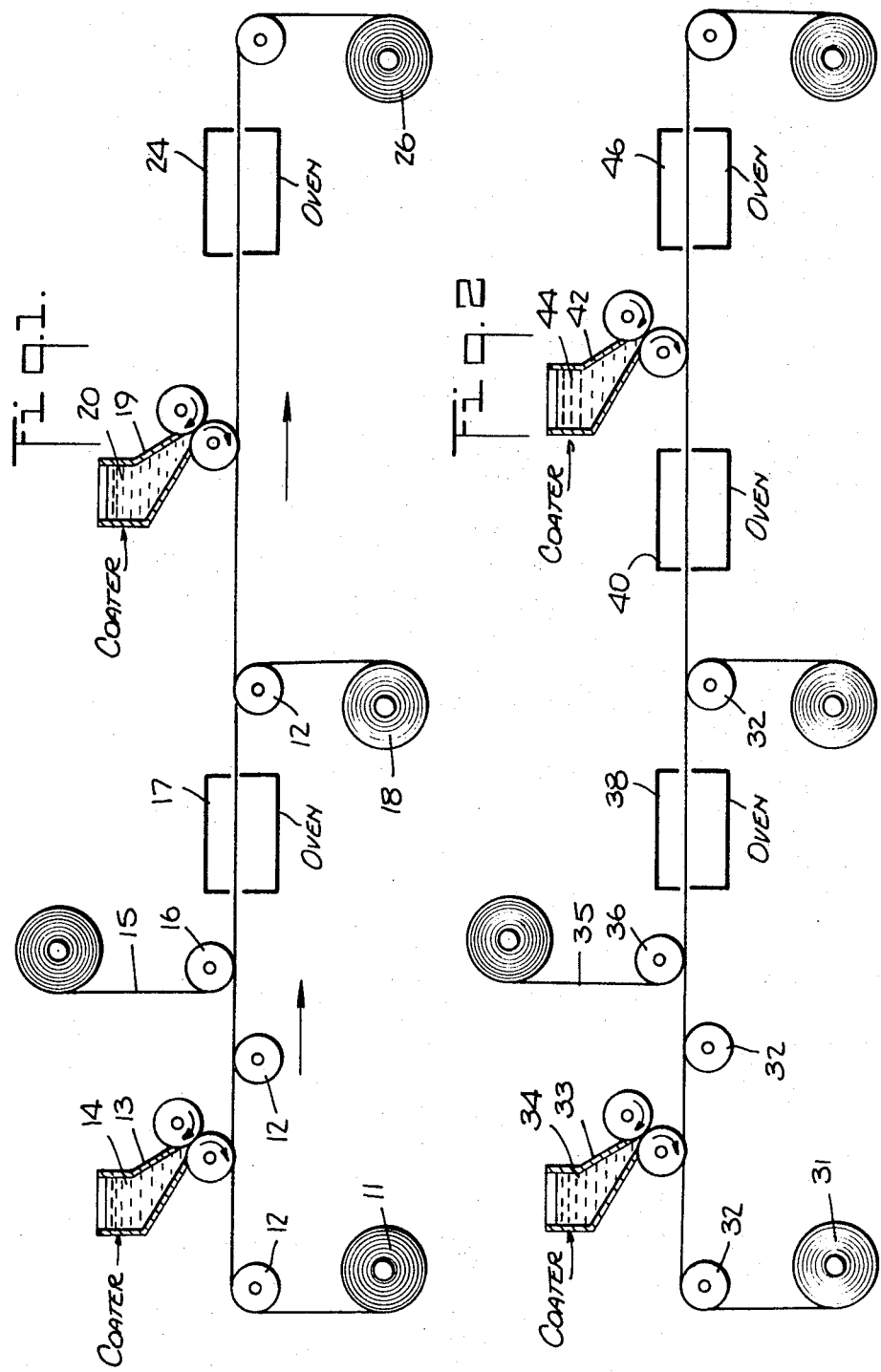
INVENTOR.
JACK PETER BRANDT
BY
Robert C. Brown
ATTORNEY

METHOD OF MAKING REINFORCED VINYL FABRIC

This invention relates to a novel method of manufacturing reinforced vinyl resin films.

Reinforced vinyl resin films are well known and widely used at the present time. Most often the vinyl resin is prepared from a dispersion of polyvinyl chloride and a plasticizer material which is subsequently heated to a fused condition. Alternatively the plastisol may be composed of a polymerized mixture of vinyl chloride with a copolymerizable material usually an organic ester. Commonly used reinforcing fiber materials include rayon, cotton, nylon. polyester typified by polyethylene terephthalate sold under the trademark "Dacron," acrylic (a long chain synthetic polymer composed of at least 85 percent by weight of acrylonitrile units) such as is sold under the trademark "Orlon," modacrylic (composed of not more than 85 percent and not less than 35 percent by weight of acrylonitrile units), typified by "Dynel." fiber as well as other synthetic fiber materials. Rayon and cotton fibers exhibit a high degree of thermal stability and do not ordinarily undergo either elongation or shrinkage at temperatures used to effect fusion of the vinyl plastisol. Synthetic reinforcing materials such as nylon and polyester when used in fabrics with mesh openings of less than approximately one-sixteenth of an inch do not cause any particular problems due to thermal changes as they can be coated directly without a support web. Regrettably, nylon, polyester, acrylic and modacrylic reinforcing made into fabrics having mesh openings larger than about one-sixteenth of an inch cannot be coated directly without a support web and undergo severe thermal contraction at temperatures ordinarily used for fusion of the vinyl plastisols. With nylon, fabric, for example, shrinkage can be as great as 15 percent when the fabric is exposed to temperatures on the order of 300° to 400° F. which is within the general range utilized for fusion of the vinyl plastisol coating material. The principal problem resulting from this high shrinkage is curling of the fabric and the creation of discontinuities in the vinyl resin coating.

The method of this invention overcomes this problem without altering conventional plastisol formulas commonly used in the manufacture of vinyl coated fabric materials and without requiring any specialized equipment.

In accordance with this invention vinyl fabric materials are manufactured by depositing a thin layer of plastisol onto a support web which can be coated paper, for example, or other materials of the like character, which will readily separate from a fused or gelled reinforced vinyl resin fabric. After application of the plastisol a reinforcing fabric is laid down on the surface of the plastisol. The reinforcing fabric can be of any synthetic fiber or natural fiber although as has been pointed out previously it is not necessary to use the techniques of this invention with materials such as cotton and rayon which do not undergo thermal shrinkage. However, nylon, Dacron polyester and other synthetic fibers are preferred reinforcing materials due to their greater strength and resistance to degradation.

After the reinforcing fabric has been laid on the surface of the plastisol material, the assembly of plastisol and reinforcing fabric is carried on the support web into a heating zone which is preferably an oven of conventional design and there heated for a sufficient duration of time to cause the plastisol to reach a gelled condition. This can be accomplished at temperatures in a range of from 165° to about 225° F. It will be appreciated that with higher temperatures shorter dwell times are required than with lower temperatures. After the vinyl plastisol has been converted to a gelled condition the combination of gelled plastisol and reinforcing fabric has sufficient dimensional strength to permit the removal of the support web which had theretofore been necessary because of the liquid or semiliquid condition of the plastisol. It is essential that the support web material be removed at this point in the process. Removal of the support web is required since at fusion temperatures, which range from about 300° to about 400° F., substantial shrinkage of the reinforcing material occurs causing the support web to curl and warp due to surface adhesion between the vinyl plastisol material and the support web. This curling and warping creates severe handling problems and produces extremely undesirable curling in the final product and discontinuities in the reinforced fabric material.

As will be obvious to those skilled in the art, cooling of the composite structure obtained upon conversion of the plastisol to the gelled condition is desirable prior to removal of the support web material. Such cooling may take place as the structure passes through the atmosphere after leaving the heating zone.

A second coating of vinyl plastisol is preferably applied to the reinforced gel at this point in the same manner as the original application. The vinyl plastisol, vinyl plastisol gel and reinforcing material are then passed into a fusion oven where the vinyl material is raised to fusion temperatures which are normally in a range of from about 300° to about 365° F. as in the case of gelation, higher temperatures permit shorter dwell times and lower temperatures require correspondingly longer times to cause the vinyl material to reach the fusion point. Fusion can be effected over a broad range of temperatures, however, it is preferred to fuse the vinyl material at temperatures in a range of from about 300° to about 325° F. The dwell time using the preferred temperature is approximately 4 minutes.

The composite structure typically cools off after it leaves the fusion oven and passes to the next step such as a windup.

Alternatively it will be appreciated that the process can be effected by fusing the first layer of plastisol immediately after gelation and removal of the support web material cooling and thereafter applying a second coating of vinyl plastisol and fusing it.

My invention will be better understood from the accompanying drawings in which:

FIG. 1 is a schematic view showing the casting of the first plastisol layer on a support web, application of reinforcing material, gelatin, removal of the support web, casting of the second plastisol layer followed by fusion.

FIG. 2 is a schematic view showing the casting of the first plastisol layer on a support web, application of reinforcing material, gelation, removal of the support web, fusion, casting of the second layer of plastisol followed by fusion.

Referrring now to FIG. 1 a strip or continuous belt of support web material 10 is unrolled from roll 11, passed over supporting rollers 12, under coater 13 which is filled with vinyl plastisol material 14, and coated with a first thin layer of vinyl plastisol. This layer is preferably from about 3 to about 20 mils in thickness. Reinforcing threads 15 are applied to the surface of the vinyl plastisol layer by roller 16. The support web, vinyl plastisol and reinforcing fibers are passed into oven 17 where the vinyl plastisol is heated to the gelation point. This temperature will normally range from about 165° to about 225° F. After emerging from the gelation oven, the support web is stripped from the gelled vinyl plastisol and rolled onto roller 18. The reinforced gelled vinyl plastisol is then passed under coater 19 which is filled with vinyl plastisol 20 and a thin layer preferably from about 3 to about 20 mils thickness is applied to the surface of the reinforced gelled plastisol by coater 19 after which the combination of gelled plastisol reinforcing material and vinyl plastisol is passed into a fusing oven 24 and heated to a fused condition at a temperature ranging from about 300° to about 365° F. The fused reinforced vinyl resin fabric is then removed from oven 24 and rolled onto roll 26.

It will be appreciated that this process can be carried out using fewer pieces of equipment than are shown in the drawings. For example rather than using two separate coaters and two separate ovens the reinforced gelled vinyl plastisol could, if desired, be returned and passed under coater 13 and then into oven 17 previously used for gelation but raised to a higher temperature to effect fusion. In the same manner rather than using rolls of support web material a continuous belt can be used if desired.

An alternative schematic process layout is shown in FIG. 2. Referring now to FIG. 2 a strip of support web material 30 is taken off of roll 31, passed over rollers 32 and under coater 33 which is filled with vinyl plastisol. Thirty-four causing a thin layer of vinyl plastisol 34 to be laid down on the support web.

Reinforcing threads 35 are applied to the surface of the vinyl plastisol layer 34 by roller 36. The support web, vinyl plastisol layer and reinforcing material are then carried into oven 38 and heated to a gelation condition. Support web 30 is stripped from the reinforced gelled plastisol after leaving oven 38. The reinforced gelled plastisol is then passed to oven 40 and heated to a fused condition. A second layer of vinyl plastisol is coated on the surface of the fused vinyl resin by coater 42 filled with vinyl plastisol 44. The coated reinforced vinyl resin is then passed to oven 46 and heated to fusion temperatures to produce the desired final product.

As will be apparent to those skilled in the art, the composite structure is cooled during the passes from oven 17 to the support stripping point and to coater 19, between ovens 38 and 40, between oven 40 and coater 42, and between ovens 24 and 46 and the final windup step in FIGS. 1 and 2.

The vinyl plastisols useful in the practice of this invention are dispersions of polyvinyl chloride and one or more plasticizers. Combinations of polymerized vinyl chloride with copolymers can also be used. Copolymeric materials which can be used in dispersions with polyvinyl chloride include copolymers of vinyl chloride with lower alkyl alkenoates such as simple esters of maleic acid and lower alkenyl alkenoates such as vinyl acetate. Useful plasticizers include dioctylphthalate, dioctylazalate as well as mixtures of these materials.

Ordinarily in such plastisols the vinyl moiety comprises from about 75 to about 25 by weight and the plasticizer from about 24 to about 75 of the plastisol. Any vinyl plastisol can be used in the practice of this invention provided it is capable of undergoing gelation at temperature below about 225°F. Which is the point at which severe shrinkage begins to occur in most commonly used synthetic reinforcing fabrics.

It will also be appreciated that the presence or absence of common plastisol additives such as stabilizers, fillers, thickeners, wetting agents, pigments and the like have no influence on the efficiency and successful use of the process of this invention.

The following specific examples will further illustrate the invention:

EXAMPLE I

PLASTISOL

| Ingredients | Parts by Weight |
| --- | --- |
| Polyvinylchloride, plastisol grade resin (Marvinol VR–50 brand) | 100 |
| Dioctylphthalate (plasticizer) | 70 |
| Barium cadmium zinc stabilizer (Argus Chemical Co. Mark BB brand). | 2 |
| Pigment (phthalocyanine Blue) | 10 |

The semiliquid was cast onto a flat casting paper by a roll coater in a thickness of temperature of 5 mils. A 12×12 scrim fabric of 800 denier nylon was applied to the exposed wet plastisol layer and then passed into an oven. The residence time in the oven was approximately 1 minute at a temperature of about 180° F. The casting paper was then stripped from the resultant nylon reinforced gel. A second layer of approximately 5 mils of semiliquid plastisol was then cast onto the surface of the gel and the resulting assembly was passed into a second oven where the temperature of the semiliquid plastisol and gelled plastisol was held at about 300° F. for approximately 4 minutes which as sufficient to bring all of the plastisol to a fused condition. The final product exhibited no signs of curling or warping due to thermal construction of the nylon scrim material and interstitial voids or discontinuities

EXAMPLE II

Example II is the same as example I except that the gelled plastisol was fused at a temperature of approximately 300° F. over a period of about 4 minutes after removal of the casting paper and prior to the application of the second layer of plastisol.

EXAMPLE III

PLASTISOL

| Ingredients | Parts by Weight |
| --- | --- |
| Vinylchloride/vinyl acetate copolymer (Marvinol VP–56 brand) | 100 |
| Dioctylphthalate (plasticizer) | 65 |
| Barium cadmium zinc stabilizer (Argus Chemical Co. Mark BB brand) | 2 |
| Calcium carbonate (filler) | 15 |

Example III is the same as example I except the formulation of the plastisol was as shown above; the gelation was effected at a temperature of approximately 195° F. over a period of about 1 minute and fusion effected at a temperature of approximately 195360° F. over a period of about 2 minutes.

EXAMPLE IV

PLASTISOL

| Ingredients | Parts by Weight |
| --- | --- |
| Vinylchloride homopolymer, plastisol grade resin (marvinol VR–53 brand) | 100 |
| Dioctylphthalate (plasticizer) | 65 |
| Barium cadmium zinc stabilizer (argus Chemical Co. Mark BB brand) | 2 |
| Calcium carbonate (filler) | 20 |

Example IV is the same as example I except the formulation of the plastisol was as shown above; gelation was effected at a temperature of approximately 210° F. over a period of about 1 minute and fusion effected at a temperature of approximately 375° F. over a period of about 2 minutes.

EXAMPLE V

Plastisol

| Ingredients | Parts by weight |
| --- | --- |
| vinylchloride/maleic ester copolymer (pliovic AO brand) | 100 |
| Dioctylphthalate (plasticizer) | 65 |
| Barium cadmium zinc stabilizer (Argus Chemical Co. Mark BB brand) | 2 |
| Lecithin (Wetting agent) | 5 |

The semiliquid plastisol was cast onto a flat casting paper by a roll coater in a thickness of approximately 5 mils. A 24=24 scrim fabric of 220 denier Dacron polyester weighing approximately 1.8 ounces per square yard was applied to the exposed wet plastisol layer and then passed into an oven and brought to a temperature of about 200 ° F, for a period of approximately 1 minute. The casting paper was then stripped from the resultant Dacron polyester reinforced gel. A second layer of approximately 5 mils of semiliquid plastisol was then cast onto the surface of the gel and passed into a second oven where the temperature of the semiliquid plastisol and gelled plastisol was held at about 360° F. for approximately 1 ½ minutes which brought all of the plastisol to a fused condition.

Reinforced fabrics produced in accordance with the above examples all exhibit a uniform smooth surface without curling or discontinuities.

It will be appreciated from the above description that the process of may invention is applicable to virtually all kinds of reinforcing materials provided the gelation temperature of the particular plastisol selected is below the temperature at which substantial shrinkage occurs. Obviously the process can be used with conventional materials such as cotton and rayon which do not undergo substantial shrinkage at plastisol fusion temperature although there is no particular advantage in this process over conventional methods.

The particular material of the web support also has no influence on the process, however the problem which my invention overcomes is greatest when the support web material used in the initial steps of the process is of paper or some other relatively thin flexible material subject to warping as a result of thermal contraction of the reinforcing material.

The thread count and thread size of the reinforcing fabric have no influence on this process although the tendency for the creation of interstitial voids and discontinuities is markedly greater using conventional methods when the fabric thread diameters are larger than about one-sixteenth of an inch. Thread sizes of this magnitude and substantially greater can be used as reinforcing materials in accordance with this invention without causing voids and surface irregularities. The fabric thread count also has a bearing on the problem which this invention overcomes in that, as the interstitial space between threads increases, so does the tendency to create voids in the fabric when the conventional method is used. The space between threads has no effect on the process when this new method is used and the weave of the reinforcing fabric can be as open and loose as desired so long as adequate reinforcing strength is achieved.

Having thus described my invention, what I claim and desire to protect by Letters patent is:

1. The method of making reinforced plastic fabric material which comprises:
   a. applying a first thin layer of vinyl plastisol onto a support web
   b. laying a network of reinforcing threads onto said first layer
   c. heating said first layer to a gelled condition at a temperature below the fusion temperature of said layer
   d. cooling the resulting assembly
   e. removing said support web from the resultant gelled layer and reinforcing threads
   f. applying a second thin layer of vinyl plastisol onto said gelled first layer
   g. heating said first and second layers and said reinforcing threads until said layers reach a fused condition.
   h. and cooling the resulting assembly.

2. A method according to claim 1 wherein said reinforcing threads are a material selected from the group consisting of nylon, polyester, acrylic, modacrylic and combinations thereof.

3 A method according to claim 1 wherein said reinforcing threads are nylon threads.

4. A method according to claim 1 wherein said reinforcing threads are polyester threads.

5. A method according to claim 1 wherein said plastisols comprise a dispersion of polyvinyl chloride and a plasticizer therefor.

6. A method according to claim 5 wherein said dispersion comprises a polymerized vinyl composition selected from the group consisting of polyvinyl chloride and polymers of vinyl chloride with at least one lower alkenoic acid, lower alkenyl alkenoate or lower alkyl alkenoate and a plasticizer thereof.

7. A method according to claim 6 wherein said dispersion is a mixture of polyvinyl chloride and a plasticizer therefor.

8. A method according to claim 6 wherein said dispersion is a mixture of a copolymer of vinyl chloride and vinyl acetate and a plasticizer therefor.

9. A method according to claim 6 wherein said dispersion is a mixture of a copolymer o vinyl chloride and maleic acid ester and a plasticizer therefor.

10. A method according to claim 6 wherein said dispersion is a mixture of polyvinyl chloride and dioctylphalate.

11. A method according to claim 6 wherein said dispersion comprises from abut 75 to about 25 by weight polymerized vinyl composition and from about 25 to about 75 by weight plasticizer.

12. A method according to claim 6 wherein said dispersion includes a stabilizer for said polymerized vinyl composition.

13. A method according to claim 1 wherein said first layer is heated to a gelation stage at a temperature of from about 165° to about 225° F.

14. A method according to claim 1 wherein said first and second layers are heated to the fusion stage at a temperature of from about 300° to 365° F.

15. A method according to claim 1 wherein the thickness of said first and second layers is from about 3 mils to about 20 mils.

16. The method of making reinforced plastic sheet material which comprises:
   a. applying a first thin layer comprised of a dispersion of polyvinyl chloride and plasticizer therefor onto a support web
   b. laying a network of nylon reinforcing threads onto said first layer
   c. heating said first layer to a gelled condition at a temperature below the fusion temperature of said layer
   d. cooling the resulting assembly
   e. removing said support web from the resultant gelled layer and nylon reinforcing threads
   f. applying a second thin layer comprised of a dispersion of polyvinyl chloride and plasticizer therefor onto said gelled first layer
   g. heating said first and second layers and said reinforcing threads until said layers reach a fused condition
   h. and cooling the resulting assembly.

17. The method of making reinforced plastic-fabric material which comprises
   a. applying a first thin layer of vinyl plastisol onto a support web
   b. laying a network of reinforcing threads onto said first layer
   c. heating said first layer to a gelled condition at a temperature below the fusion temperature of said layer
   d. cooling the resulting assembly
   e. removing said support web from the resultant gelled first layer and reinforcing threads
   f. heating said gelled layer and reinforcing threads until said first layer reaches a fused condition
   g. cooling the resulting assembly
   h. applying a second thin layer of vinyl plastisol onto said fused first layer
   i. heating said first and second layers and said reinforcing threads until said second layer reaches a fused condition
   j. and cooling the resulting assembly.

* * * * *

UNITED STATES PATENT OFFICE
CERTIFICATE OF CORRECTION

Patent No. 3,622,416            Dated November 23, 1971

Inventor(s) Jack P. Brandt

It is certified that error appears in the above-identified patent and that said Letters Patent are hereby corrected as shown below:

Column 5, line 42, after "condition", delete the period. Column 6, line 5, change "o" to -- of -- ; line 8, "dioctylphalate" should read -- dioctylphthalate -- ; line 10, "about 75 to about 25" should read -- about 75% to about 25% -- ; line 11 change "25" to -- 25% -- , same line, "75" should read -- 75% -- . Column 6, line 16, change "165°" to -- 165°F. -- ; line 20, change "300°" to -- 300°F. -- .

Signed and sealed this 14th day of November 1972.

(SEAL)
Attest:

EDWARD M. FLETCHER, JR.
Attesting Officer

ROBERT GOTTSCHALK
Commissioner of Patents